United States Patent
Tien et al.

(10) Patent No.: US 8,011,795 B2
(45) Date of Patent: Sep. 6, 2011

(54) DIRECT TYPE BACKLIGHT MODULE

(75) Inventors: Yen-Ping Tien, Taipei Hsien (TW); Zuo Chai, Shenzhen (CN); Gwo-Yan Huang, Taipei Hsien (TW)

(73) Assignees: Hong Fu Jin Precision Industry (ShenZhen) Co., Ltd., Shenzhen, Guangdong Province (CN); Hon Hai Precision Industy Co., Ltd., Tu-Cheng, New Taipei (TW)

( * ) Notice: Subject to any disclaimer, the term of this patent is extended or adjusted under 35 U.S.C. 154(b) by 255 days.

(21) Appl. No.: 12/406,192

(22) Filed: Mar. 18, 2009

(65) Prior Publication Data

US 2010/0033953 A1 Feb. 11, 2010

(30) Foreign Application Priority Data

Aug. 6, 2008 (CN) .......................... 2008 1 0303559

(51) Int. Cl.
*G09F 13/04* (2006.01)

(52) U.S. Cl. .................. 362/97.3; 362/97.1; 362/249.02

(58) Field of Classification Search ............... 362/97.1, 362/97.3, 249.02
See application file for complete search history.

(56) References Cited

U.S. PATENT DOCUMENTS

| | | | |
|---|---|---|---|
| 7,766,516 B2* | 8/2010 | Chen et al. ................... 362/330 |
| 7,815,330 B2* | 10/2010 | Kim et al. ..................... 362/97.3 |
| 2007/0139929 A1* | 6/2007 | Yoo et al. ...................... 362/294 |
| 2008/0002391 A1* | 1/2008 | Lee ................................ 362/97 |
| 2008/0106899 A1* | 5/2008 | Cheng et al. .................. 362/247 |

* cited by examiner

*Primary Examiner* — Evan Dzierzynski
(74) *Attorney, Agent, or Firm* — Altis Law Group, Inc.

(57) ABSTRACT

A direct backlight module includes a light optical plate, a plurality of point light sources, and a reflective member. The optical plate includes a light input surface and a light output surface opposite to the light output surface. The point light sources are positioned between the optical plate and the reflective member. The reflective element forms a plurality of curved reflective surfaces corresponding to the point light sources. Each curved reflective surface is a substantially spherical depression, and each point light source corresponds to a center of each spherical depression defined by one of the curved reflective surfaces.

8 Claims, 3 Drawing Sheets

DIRECT TYPE BACKLIGHT MODULE

BACKGROUND

1. Technical Field

The present disclosure relates to a backlight employed in a liquid crystal display and, particularly, to a direct type backlight module which employs point light sources.

2. Description of the Related Art

Referring to FIG. 3, a typical direct backlight module 10 includes a frame 11, a reflective sheet 14, an optical plate 15, and a plurality of point light sources 13. The frame 11 includes a base 111 and a plurality of sidewalls 113 extending from a periphery of the base 111. The base 111 and the sidewalls 113 cooperatively define a cavity (not labeled). The point light sources 13 are positioned on the base 111. The optical plate 15 is positioned on a top of the sidewalls 113 above the point light sources 13. The reflective sheet 14 defines a plurality of through holes 141 corresponding to the point light sources 13. Light emitting portions 131 of the point light sources 13 are passed through the through holes 141 to emit light such that the light projects to the optical plate 15.

However, light spots often occur due to the light emitting portions 131 of the point light sources 13 directly facing the optical plate 15.

Therefore, a backlight module to solve the aforementioned problems is desired.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout several views, and all the views are schematic.

DETAILED DESCRIPTION

Figure 1:
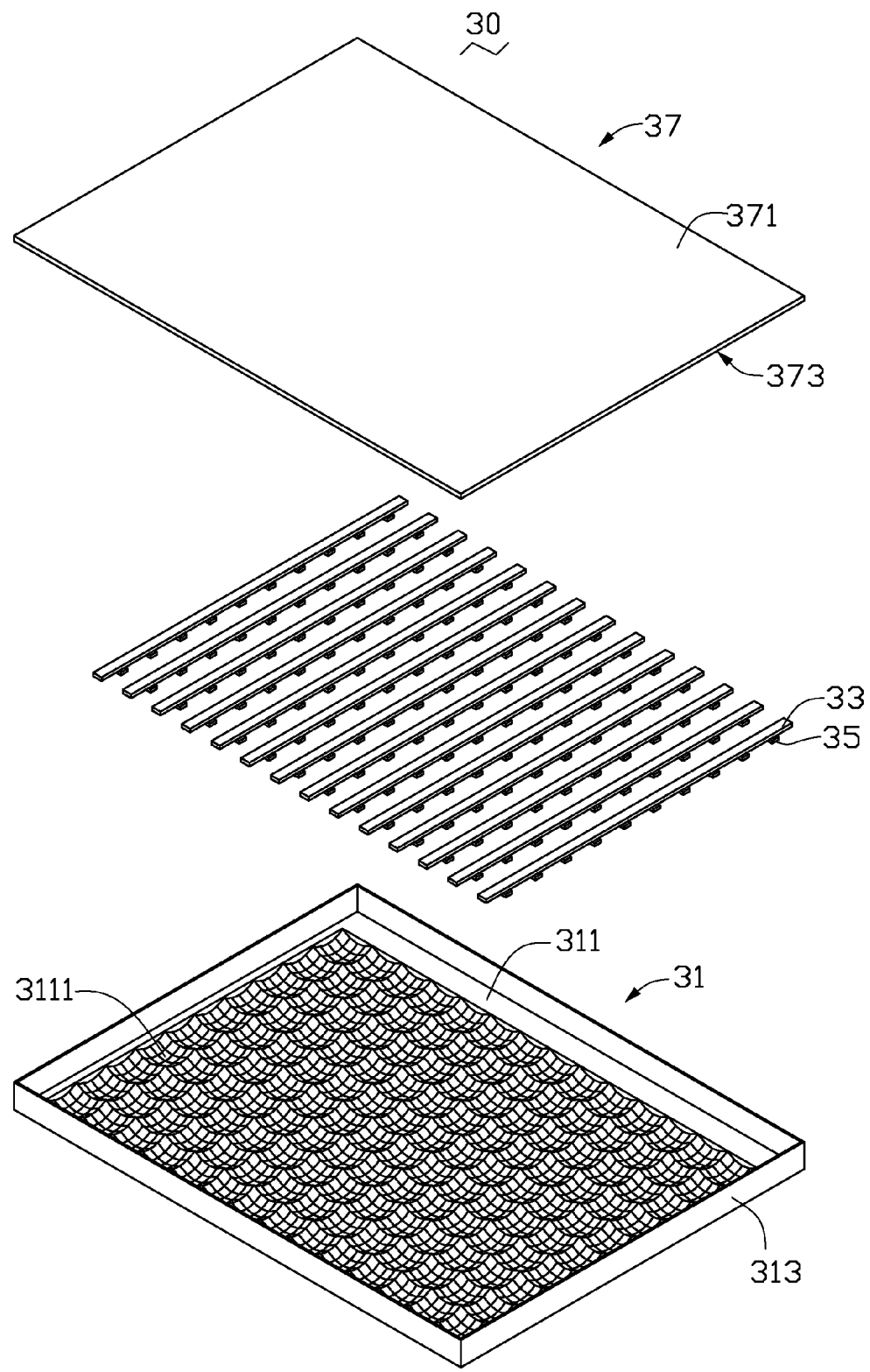
FIG. 1 is an isometric, exploded view of an embodiment of a backlight module.
Figure 2:
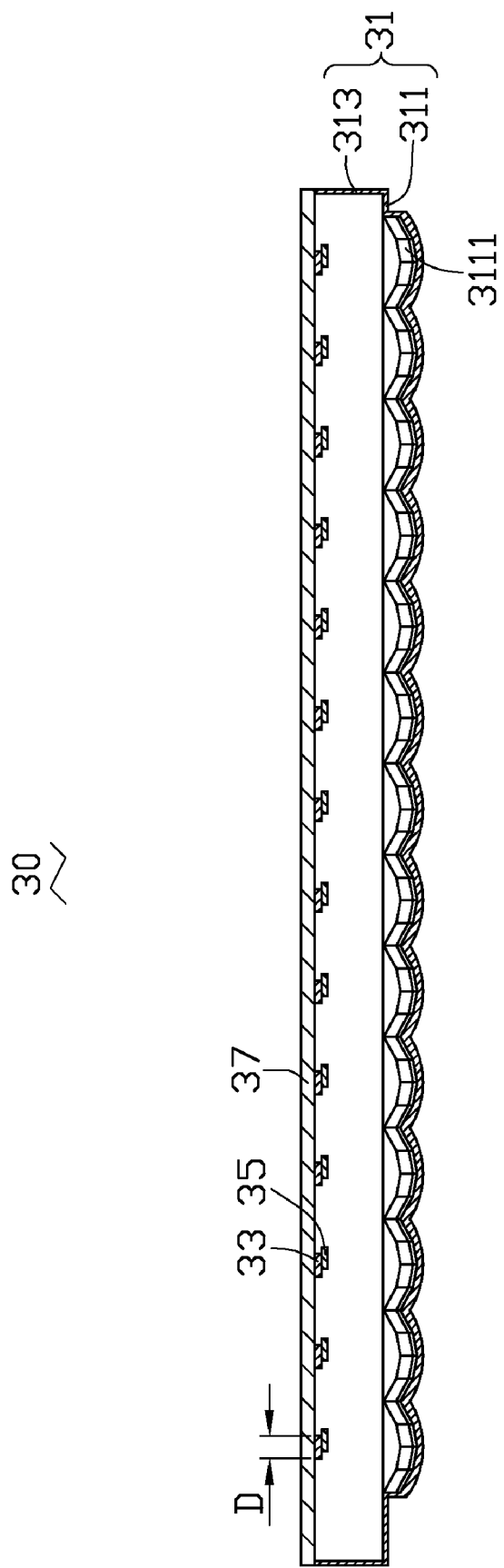
FIG. 2 is a cross-sectional view of the backlight module in FIG. 1, after the backlight module is assembled.
Figure 3:
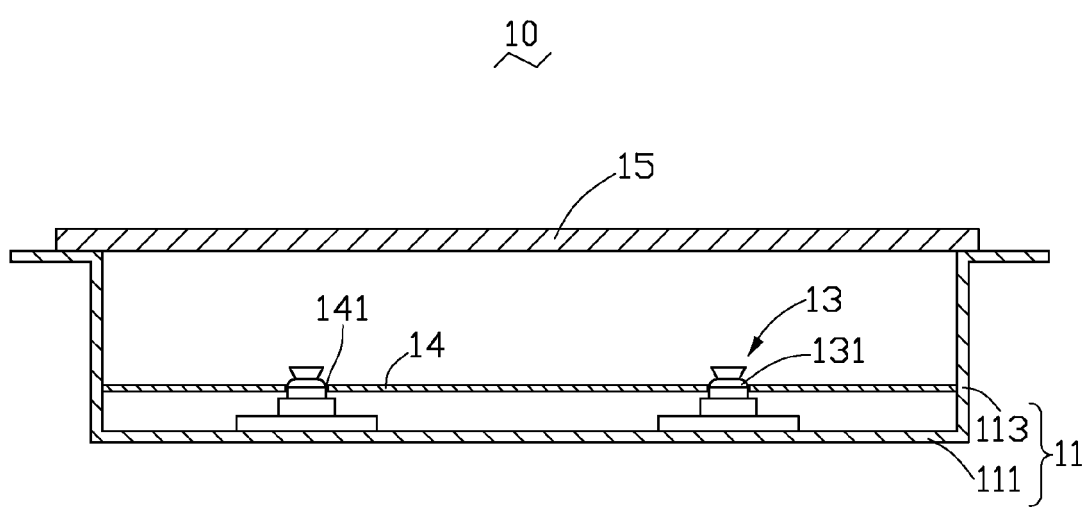
FIG. 3 is a side cross-sectional view of a typical backlight module.

Referring to FIGS. 1 and 2, an embodiment of a backlight module 30 includes a frame 31, a plurality of elongated flexible printed circuited boards (PCBs) 33, a plurality of point light sources 35, and an optical plate 37.

The frame 31 includes a base 311 and four sidewalls 313 extending from a periphery of the base 311. The base 311 of the frame 31 may be integrally formed with the sidewalls 313. The base 311 and the sidewalls 313 cooperatively define a cavity (not labeled). The base 311 forms a plurality of curved reflective surfaces 3111. In the illustrated embodiment, each curved reflective surface 3111 is a substantially spherical depression.

A width D of each flexible PCB 33 is less than 5 millimeters (mm). In the illustrated embodiment, each point light source 35 is a side-emission type light-emitting diode. The optical plate 37 may be made of transparent resin. The optical plate 37 includes a light output surface 371 and a light input surface 373. The light output surface 371 and the light input surface 373 are on opposite sides of the optical plate 37.

To assemble the backlight module 30, the point light sources 35 are positioned on edges of the flexible PCBs 33. The flexible PCBs 33 are adhered on the light input surface 373 of the optical plate 37. The optical plate 37 is positioned on a top of the sidewalls 313. Each point light source 35 corresponds to one of the curved reflective surfaces 3111. In the illustrated embodiment, each point light source 35 faces the base 311 directly, and each point light source 35 is positioned directly above a center of a spherical depression defined by one of the curved reflective surfaces 3111.

The point light sources 35 emit light. A portion of the light projecting to the optical plate 37 is transmitted through the optical plate 37, and another portion of the light projecting to the base 311 is reflected by the curved reflective surfaces 3111 towards the optical plate 37 before being transmitted the optical plate 37.

When light impinges the curved reflective surfaces 3111, light is reflected at different angels, thereby limiting strong light spots from forming on the optical plate 37.

It should be pointed out that because the width D of the flexible PCBs 33 is less than 5 mm and the point light sources 35 are positioned on the edges of the flexible PCBs 33, a portion of the light from the point light sources 35 is diffused by a portion of the optical plate 37 adjacent to the flexible PCBs 33, thereby limiting shadows of the flexible printed circuit boards 33 from forming.

Dust is prevented from entering the backlight module because the base 311, the sidewalls 313, and the optical plate 37 cooperatively define a closed cavity.

In the illustrated embodiment, the base 311 may be reflective or have a reflective surface. In an alternative embodiment, a separate reflective member that has a plurality of curved reflective surfaces corresponding to the point light sources may be positioned on the base. In addition, the reflective member may also consist of a plurality of small reflecting sheets or reflecting plates. Furthermore, a shape and a curve ratio of each curved reflective surface 3111 can be adjusted according to a distance between the point light sources and the corresponding curved reflective surfaces 3111.

It should be pointed out that the point light sources 35 may be other point light sources. In addition, the point light sources 35 may be positioned between the base 311 and the light input surface 373 by other means. For example, a mesh-structured supporting member may be positioned between the base 311 and the light input surface 373, and the point light sources are fixed on the mesh-structured supporting member.

It should be pointed out that a plurality of printing dots or depressions may also be formed on the light input surface, to further improve a light uniformity of the back light module 30. Furthermore, the optical plate may also include a plurality of diffusion particles dispersed in the optical plate to further improve the light uniformity of the back light module 30.

Finally, while various embodiments have been described and illustrated, the disclosure is not to be construed as being limited thereto. Various modifications can be made to the embodiments by those skilled in the art without departing from the true spirit and scope of the disclosure as defined by the appended claims

What is claimed is:

1. A direct type backlight module, comprising:
an optical plate comprising a light input surface; and a light output surface opposite to the light input surface;
a reflective member having a plurality of curved reflective surfaces;
a plurality of point light sources corresponding to the curved reflective surfaces positioned between the reflective member and the light input surface, and facing the reflective member, wherein each curved reflective surface is a substantially spherical depression, and each point light source corresponds to a center of each spherical depression defined by one of the curved reflective surfaces; and a plurality of elongated flexible printed circuit boards, wherein the flexible printed circuit boards are attached on the light input surface of the optical plate, and the point light sources are positioned on edges of the flexible printed circuit boards.

2. The direct type backlight module of claim 1, further comprising a frame, wherein the frame comprises a base and a plurality of sidewalls extending from a periphery of the base; the base is the reflective member; the optical plate is positioned on a top of the sidewalls.

3. The direct type backlight module of claim 2, wherein the base is integrally formed with the sidewalls.

4. The direct type backlight module of claim 1, wherein a width of the flexible printed circuit board is less than 5 mm.

5. The direct type backlight module of claim 1, wherein the light input surface forms a plurality of printing dots.

6. The direct type backlight module of claim 1, wherein the light input surface defines a plurality of depressions therein.

7. The direct type backlight module of claim 1, wherein the optical plate is made of transparent resin.

8. The direct type backlight module of claim 7, wherein the optical plate comprises a plurality of diffusion particles embedded in the transparent resin.

* * * * *